United States Patent [19]
Rice

[11] 3,906,600

[45] Sept. 23, 1975

[54] METHOD OF MAKING METALLIZED RESISTOR-CAPACITOR UNIT WITH IMPROVED INSULATION BETWEEN LEADS

[75] Inventor: Ronald Bernard Rice, Clinton, Md.

[73] Assignee: Illinois Tool Works Inc., Chicago, Ill.

[22] Filed: July 3, 1974

[21] Appl. No.: 485,683

[52] U.S. Cl. .................. 29/25.42; 29/592; 317/256
[51] Int. Cl.² .......................................... H01G 4/40
[58] Field of Search .......... 29/25.42, 592; 317/256; 1/260

[56] References Cited
UNITED STATES PATENTS

| | | | |
|---|---|---|---|
| 3,242,403 | 3/1966 | Fanning | 317/260 |
| 3,758,833 | 9/1973 | Rayburn | 317/260 |

*Primary Examiner*—E. A. Goldberg
*Attorney, Agent, or Firm*—Robert W. Beart; Glenn W. Bowen

[57] ABSTRACT

A wound resistor-capacitor unit using a double-sided metallized dielectric film layer and a pair of conductive foils each of which contact one of the leads of the capacitor and one side of the metallized strip is disclosed. The resistor-capacitor unit has improved insulation resistance between the leads due to a dielectric film strip which is placed between one of the foils and one surface of the double metallized layer. The resistor-capacitor unit is then formed by winding these elements about the lead so that the dielectric film strip provides both increased insulation between the leads and an outer layer around the unit. An additional insert of insulating material may be placed between the foil and the dielectric film strip.

4 Claims, 5 Drawing Figures

METHOD OF MAKING METALLIZED RESISTOR-CAPACITOR UNIT WITH IMPROVED INSULATION BETWEEN LEADS

BACKGROUND OF THE INVENTION

Double-sided metallized plastic dielectric films are highly desirable for wound electrical resistor-capacitor units since they provide a self-healing characteristic when an electrical breakthrough or arcing occurs in the dielectric. The breakthrough or arcing can be removed by applying a current surge to the metallized film to burn out the thin deposited layer of metal in the area of the breakthrough.

Also, in the winding of an electrical capacitor unit, it is desirable to use the lead wires as winding mandrels since they will remain in place after the winding is completed; and thus, the possibility of having the resistor-capacitor unit unwind is greatly reduced since the lead wires are not retracted after winding. Therefore, a resistor-capacitor unit wound about the leads and using double-sided metallized film would be a highly advantageous resistor-capacitor unit. It has been found that this type of resistor-capacitor unit can be improved upon even more by providing a thin foil of a conductive material between the leads and the outer surfaces of the double-sided metallized film. This metallized foil will provide improved electrical contact between the leads and the electrode areas of the resistor-capacitor unit, and it will also reduce the possibility of failure due to tearing of the metallized film layer in the area of the leads. An example of such a construction for a capacitor is shown in co-pending U.S. Pat. application Ser. No. 440,495 filed in the name of John Phillip Uhl and Ki Hong Kim, which application is assigned to the assignee of the present invention.

In the capacitor of the Uhl et al. application, a plastic outer insulating layer is wound about the formed capacitor by using a retractable mandrel. When the winding is completed, the outer insulating layer is heat sealed to itself so as to form an outer protective coating over the capacitor. While the capacitor of the Uhl et al application is a highly desirable and improved capacitor, it has been found that this capacitor did not provide sufficient electrical insulation between the leads for high voltage applications. The resistor-capacitor unit of the present invention retains the advantages of the use of double-sided film and foil strips between the leads and the film, while also providing for significantly improved electrical insulation between the leads. In addition, the dielectric strip which is used to provide insulation between the leads is the same strip that provides the outer insulating layer for the resistor-capacitor unit. In this manner the construction of the resistor-capacitor unit is not only improved, but the winding of the resistor-capacitor unit is made simpler because the retractable mandrel that is employed to wind the capacitor of the Uhl et al application is no longer required.

It is, therefore, the object of the present invention to provide for an improved wound resistor-capacitor unit using a double-sided metallized film, a pair of leads, a conductive foil between at least one of the leads and one side of the double-sided metallized film and a dielectric insulating layer which is inserted between said foil and said side of the double-sided metallized film in order to improve the insulation between the leads and to provide the resistor-capacitor unit with an outer insulating layer.

TECHNICAL DESCRIPTION OF THE INVENTION

Figure 1:
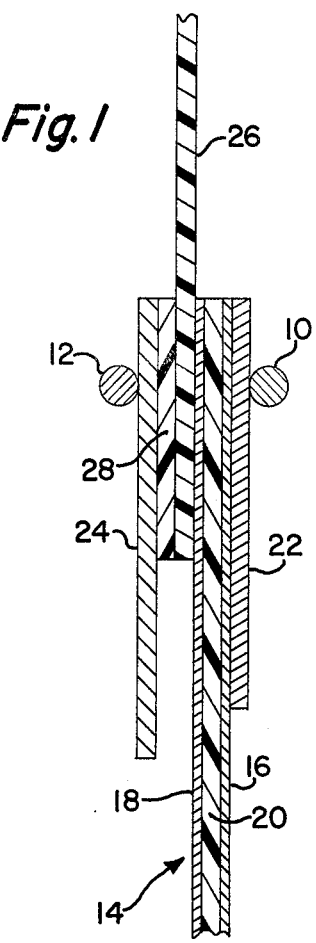
FIG. 1 shows a cross-sectional view of the layers of material that are used to form the resistor-capacitor unit prior to their being wound about the leads of the unit.

Referring to FIG. 1 there is shown a pair of electrically conductive leads 10, 12 and five separate layers of material 14, 22, 24, 26, and 28 which are used to form the resistor-capacitor unit of the present invention by winding the leads about one another. The main electrode portions of the resistor-capacitor unit are formed by a double-sided metallized film 14 which consists of metallized sides 16, 18 which are deposited in thin layers on opposite sides of a suitable plastic dielectric layer 20. The metallized layers 16, 18 may be formed of aluminum, copper, zinc, silver, or other suitable electrically conductive layers which may be deposited in a thin film form on a dielectric material. The dielectric layer 20 may be polycarbonate, polyester, polystyrene, or any other suitable material. A first conductive foil 22 is inserted between the lead 10 and the surface 16 of the metallized strip 14, and a second conductive foil 24 is inserted so as to contact the leads 12. The foils 22, 24 may be aluminum foil, tin foil, or any other suitable electrically conductive foil. The resistance of the unit is provided by the contact resistance between the foils 22, 24 and the metallized layers 16, 18, respectively. The amount of resistance that is provided is controlled by controlling the length, surface area, and thickness of the foils 22, 24. The ends of the resistor-capacitor unit are not sprayed with a conductive film when the unit is formed. This contrasts with the construction of a capacitor formed in a similar manner since end spraying would normally be used to reduce the resistance of a capacitor unit.

A plastic dielectric film strip 26 of polycarbonate, polystyrene, polyester, or other suitable dielectric film material is inserted into the capacitor intermediate the conductive foil 24 and the metallized surface 18 of the metallized film 14. The dielectric film strip 26 extends beyond the lead 12 a short distance in one direction and extends out of the layered structure in a direction opposite of that of the layers 20, 22, 24. If desired, a second short strip of dielectric material 28 may be inserted between the plastic film 26 and the foil 24 so as to further increase the insulation resistance between the leads 10, 12 in the vicinity of the lead area, as shown in FIG. 2.

Figure 2:
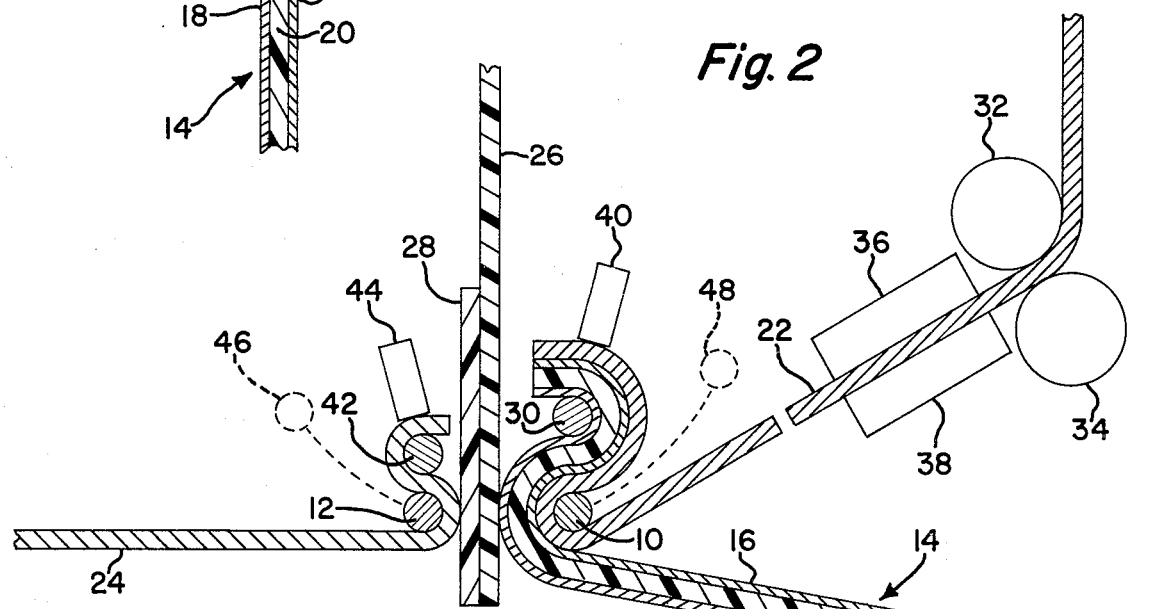
FIG. 2 is a diagrammatic representation illustrating the manner in which the layers that form the resistor-capacitor unit are placed between and are wound about the lead wires.

FIG. 2 is a diagrammatic representation of a machine which operates to wind the resistor-capacitor unit of the present invention. The double-sided metallized film strip 14 is wrapped around the lead wire 10 and over the guide roller 30. The conductive foil 22 passes between the feed roller 32 and the pinch roller 34 and through the guide members 36, 38 into contact with the surface 16 of the metallized film 14, and then it travels over the top of the guide roller 30. A clamp means 40 holds the outer ends of the metallized strip 14 and the foil 22 in place. The conductive foil 24 passes over the lead 12 and around the support roller 42, and the outer end of the foil 24 is held in place by means of the clamp 44. The lead wires 10, 12 are moved from their initial position 46, 48 represented by the dotted circles in FIG. 2, to the position they are shown at in FIG. 2 when the winding is to begin.

Figure 3:
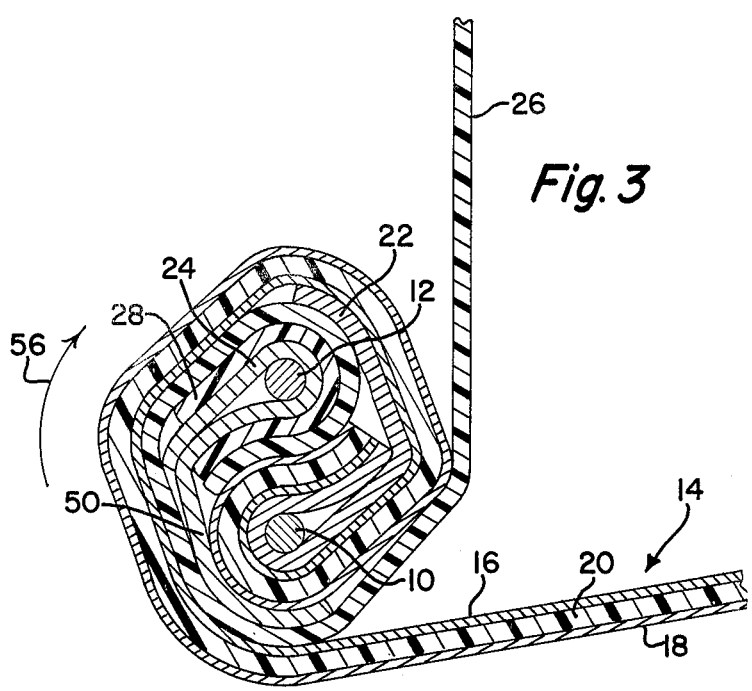
FIG. 3 is a partially completed resistor-capacitor unit which shows how the layers are related as the resistor-capacitor unit is wound.

The layers of the resistor-capacitor unit are wound about one another, as indicated by the arrow 56 in FIG. 1, so that the respective layers of the resistor-capacitor unit are related as shown in FIG. 3. As seen in FIG. 3, the insulating layer 26 and the insulating layer 28 isolate the lead 12 from the surface 18 of the double-sided metallized film layer 14 in the area of the leads. Contact between the foil 24 and the surface 18 of the metallized film layer 14 is first made away from the lead area at approximately the location 50. The foil 22, on the other hand, makes contact with the surface layer 16 of the double-sided metallized film layer 14 along substantially the entire length of the foil 22. Thus, it is seen that between the leads 10, 12 there are three layers of dielectric material. These are the layer 20 of the double-sided metallized strip 14, the layer 26 and the insert layer 28. In this way increased insulation resistance is provided between the leads 10, 12 and the high voltage utility of the resistor-capacitor unit is improved.

Figure 4:
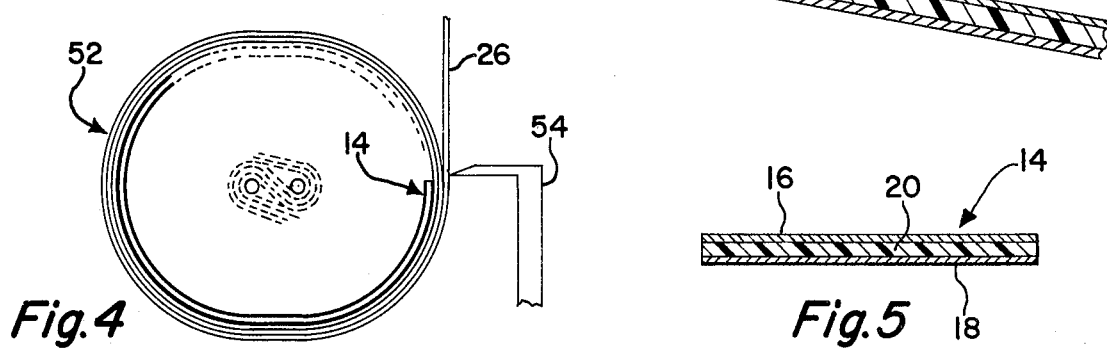
FIG. 4 is a completed resistor-capacitor unit in which the outer covering layer is heat sealed to itself.
Figure 5:
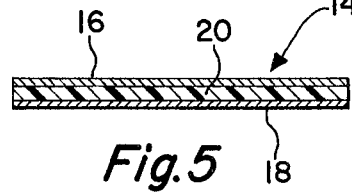
FIG. 5 is a cross-sectional view of the double-sided metallized film of the present invention.

As winding of the resistor-capacitor unit of FIG. 3 continues, the desired capacitance value is eventually reached, and the double-sided metallized film 14 is cut. However, the dielectric film strip 26 continues to be supplied and wound around the outer surface of the resistor-capacitor unit 52, as shown in FIG. 4, in order to provide an outer insulating cover for the resistor-capacitor unit. The completed resistor-capacitor unit 52 of FIG. 4 is achieved when a heat sealing means 54 is utilized to melt the end of the dielectric strip 26 to an underlying winding of the same strip 26 so as to provide surface-to-surface sealing between overlapping layers of the plastic film 26.

The invention is claimed as follows:

1. A method of forming a wound resistor-capacitor unit, the ends of which are not sprayed with a conductive electrode interconnecting film upon completion of said unit, and including first and second electrical leads and a first conductive foil in contact with said first electrical lead comprising aligning one end of a double-sided metallized dielectric film layer with a terminating end of said first conductive foil, inserting a dielectric film strip intermediate one side of said double-sided metallized film layer and said first conductive foil so that a relatively short portion of said dielectric film strip extends intermediate said leads to a terminating end of said dielectric film strip while the remainder of said dielectric film strip extends beyond said terminating ends of said metallized dielectric film layer and said first conductive foil, winding said leads about one another so as to form a wound resistor-capacitor unit with said first conductive foil being in contact with the side of said double-sided metallized film layer that is adjacent said dielectric film strip, cutting said double-sided metallized film layer prior to cutting said dielectric film strip, wrapping the outer extremity of said dielectric film strip around the outside of said capacitor and sealing said dielectric film strip so as to form an insulating cover layer for said resistor-capacitor unit.

2. A method as claimed in claim 1 in which a dielectric insert is positioned intermediate said dielectric film strip and said first conductive foil so that a terminating end of said insert is in alignment with a terminating end of said double-sided metallized film layer and a terminating end of said first conductive foil.

3. A method of forming a wound resistor-capacitor unit, the ends of which are not sprayed with a conductive electrode interconnecting film upon completion of said unit, and including first and second electrical leads, a first conductive foil in contact with said first electrical lead and a second conductive foil in contact with said second electrical lead comprising aligning one end of a double-sided metallized dielectric film layer with a terminating end of said first conductive foil and a terminating end of said second conductive foil, inserting a dielectric film layer and said first conductive foil so that a relatively short portion of said dielectric film strips extends intermediate said leads to a terminating end of said dielectric film strip while the remainder of said dielectric film strip extends beyond said terminating ends of said metallized dielectric film layer and said first conductive foil, winding said leads about one another so as to form a wound resistor-capacitor unit with said first conductive foil being in contact with the side of said double-sided metallized film layer that is adjacent said dielectric film strip and said second conductive foil being in contact with the other side of said double-sided metallized film layer, cutting said double-sided metallized film layer prior to cutting said dielectric film strip, wrapping the outer extremity of said dielectric film strip around the outside of said resistor-capacitor unit and sealing said dielectric film strip so as to form an insulating cover layer for said resistor-capacitor unit.

4. A method as claimed in claim 3 in which a dielectric insert is positioned intermediate said dielectric film strips and said first conductive foil so that a terminating end of said insert is in alignment with a terminating end of said double-sided metallized film layer and a terminating end of said first and second conductive foils.

* * * * *